US008658922B2

(12) United States Patent
Shellabarger et al.

(10) Patent No.: US 8,658,922 B2
(45) Date of Patent: Feb. 25, 2014

(54) ELECTRICAL SWITCH FOR A VEHICLE STEERING WHEEL ASSEMBLY

(75) Inventors: Richard Shellabarger, Sterling Heights, MI (US); Conrad Dumbrique, Lake Orion, MI (US); Kenneth Pijaszek, Grand Blanc, MI (US); Donald Paxton, Romeo, MI (US)

(73) Assignee: Autoliv ASP, Inc., Ogden, UT (US)

( * ) Notice: Subject to any disclaimer, the term of this patent is extended or adjusted under 35 U.S.C. 154(b) by 243 days.

(21) Appl. No.: 13/101,848

(22) Filed: May 5, 2011

(65) Prior Publication Data

US 2012/0279835 A1 Nov. 8, 2012

(51) Int. Cl.
*H01H 9/00* (2006.01)

(52) U.S. Cl.
USPC ..................................... 200/61.55

(58) Field of Classification Search
USPC ............. 200/61.55, 61.54, 61.27, 61.56, 293, 200/302.2, 329, 333, 341, 505, 5 R, 5 A
See application file for complete search history.

(56) References Cited

U.S. PATENT DOCUMENTS

| 2,740,874 A | 8/1951 | Kelly at al. |
| 4,762,970 A | 8/1988 | Brinsley |
| 4,839,512 A | 6/1989 | Speck |
| 5,171,163 A | 12/1992 | McClelland |
| 5,239,147 A | 8/1993 | Allard et al. |
| 5,350,190 A * | 9/1994 | Szigethy ............ 280/728.2 |
| 5,482,230 A | 1/1996 | Bird et al. |
| 5,698,828 A * | 12/1997 | Perkins ................. 200/61.54 |
| 6,724,195 B2 | 4/2004 | Lurtz |
| 8,193,460 B2 * | 6/2012 | Braun et al. ........... 200/61.54 |
| 2006/0054479 A1 | 3/2006 | Iisaka et al. |
| 2007/0278772 A1 | 12/2007 | Burghardt et al. |

OTHER PUBLICATIONS

International Search Report, In'l Appl No. PCT/US 12/36572, Int'l Filing Date: May 4, 2012, Mail Date: Jul. 18, 2012, (2) pgs.

* cited by examiner

*Primary Examiner* — Edwin A. Leon
*Assistant Examiner* — Anthony R. Jimenez
(74) *Attorney, Agent, or Firm* — Evan Reno Sotiriou; The Small Patent Law Group

(57) ABSTRACT

An electrical switch for a vehicle steering wheel assembly is provided. The electrical switch includes a pressure actuated cable having a compressible semi-conductive material between a plurality of conductors therein. The electrical switch further includes a mechanical actuator configured to compress the pressure actuated cable such that an electrical path is formed through the plurality of conductors to activate a component of the vehicle.

18 Claims, 12 Drawing Sheets

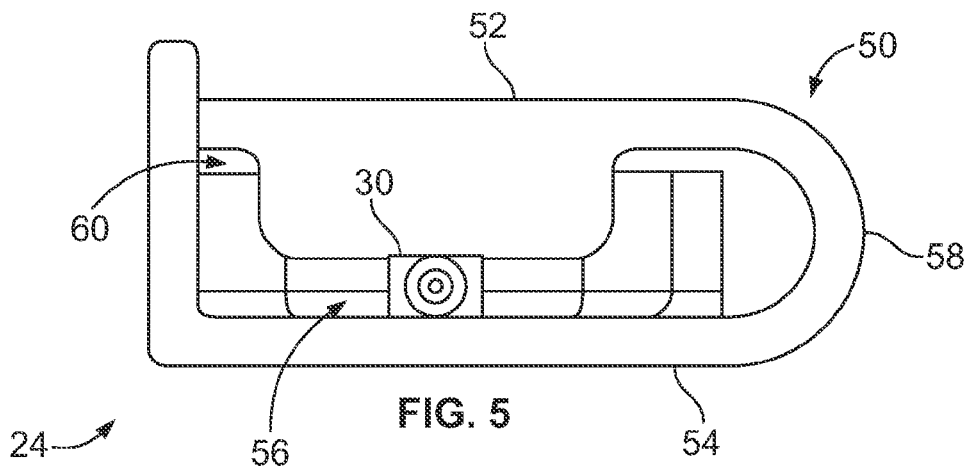
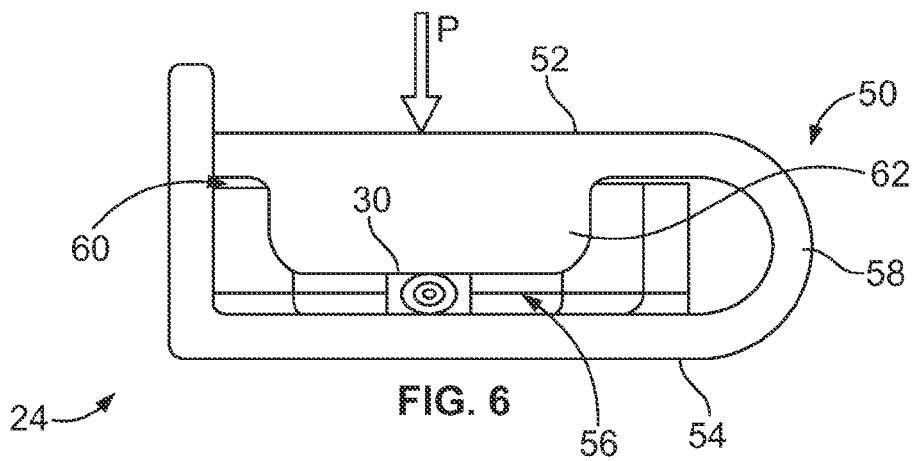
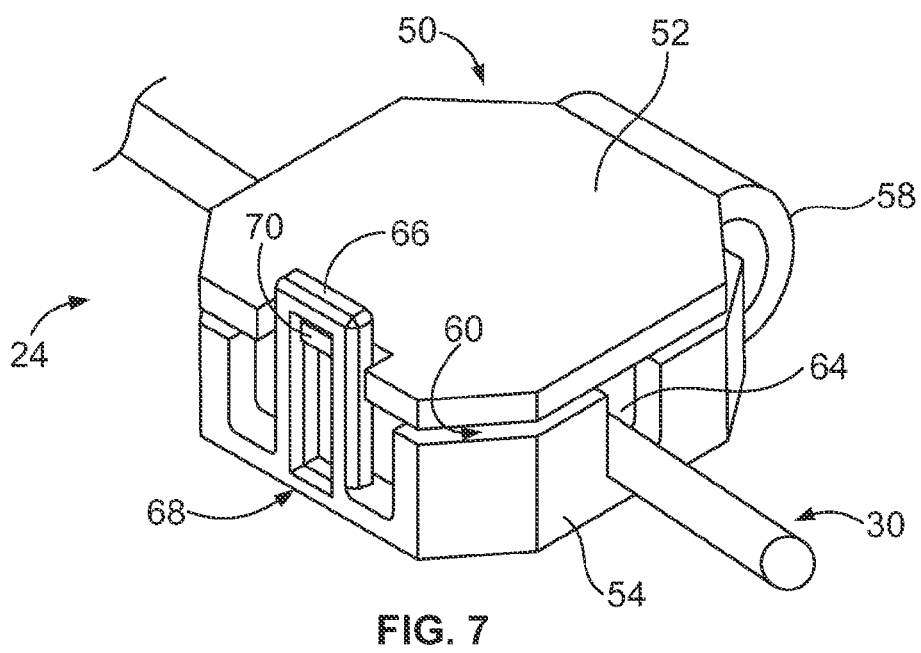

ELECTRICAL SWITCH FOR A VEHICLE STEERING WHEEL ASSEMBLY

BACKGROUND OF THE INVENTION

The subject matter disclosed herein relates generally to electrical switches for vehicles, and more particularly to an electrical horn switch for a steering wheel assembly, particularly a steering wheel assembly having an airbag.

Steering wheel/driver airbag assemblies for horn activation typically include a low current switch, which is activated when a vehicle operator presses on the driver airbag. Switches for low current applications, such as these electrical horn switches, have problems with the contacts of the switches becoming corroded. For example, in wheel/driver airbag assemblies, the contacts of conventional horn switches are exposed to the environment and subject to contamination from corrosions and foreign substances that enter into the wheel/driver airbag assemblies. The corrosion can lead to loss of electrical continuity, which may be permanent or intermittent. In vehicle applications, the loss of electrical continuity results in a loss of horn capabilities in the vehicle, which is undesirable and can be dangerous.

BRIEF DESCRIPTION OF THE INVENTION

In accordance with various embodiments, an electrical switch arrangement for a vehicle is provided that includes a pressure actuated cable having a compressible semi-conductive material between a plurality of conductors therein. The electrical switch arrangement further includes a mechanical actuator configured to compress the pressure actuated cable such that an electrical path is formed through the plurality of conductors to activate a component of the vehicle.

In accordance with other embodiments, a vehicle horn switch for a steering wheel/airbag assembly is provided that includes a pressure actuated cable having an outer sheath and a pair of electrical conductors within the outer sheath. The pair of electrical conductors are separated by a crushable semi-conductive material. The vehicle horn switch further includes a fastener connecting the steering wheel/airbag assembly to a steering wheel. The fastener is configured to compress the pressure actuated cable to crush the semi-conductive material and electrically connect the pair of electrical conductors.

In accordance with yet other embodiments, an electrical switch kit for a vehicle horn is provided that includes a pressure actuated cable having a compressible semi-conductive material between a plurality of conductors therein. The electrical switch kit further includes a mechanical actuator configured to compress the pressure actuated cable such that an electrical path is formed through the plurality of conductors to activate a component of the vehicle. The electrical switch kit also includes a fastener for connecting the mechanical actuator to the vehicle.

BRIEF DESCRIPTION OF THE DRAWINGS

FIG. 5 is a cross-sectional view of a mechanical actuator formed in accordance with one embodiment.

FIG. 6 is another cross-sectional view of the mechanical actuator of FIG. 5 illustrating a compressed state.

FIG. 7 is a perspective view of the mechanical actuator of FIG. 5.

DETAILED DESCRIPTION OF THE INVENTION

Figure 1:
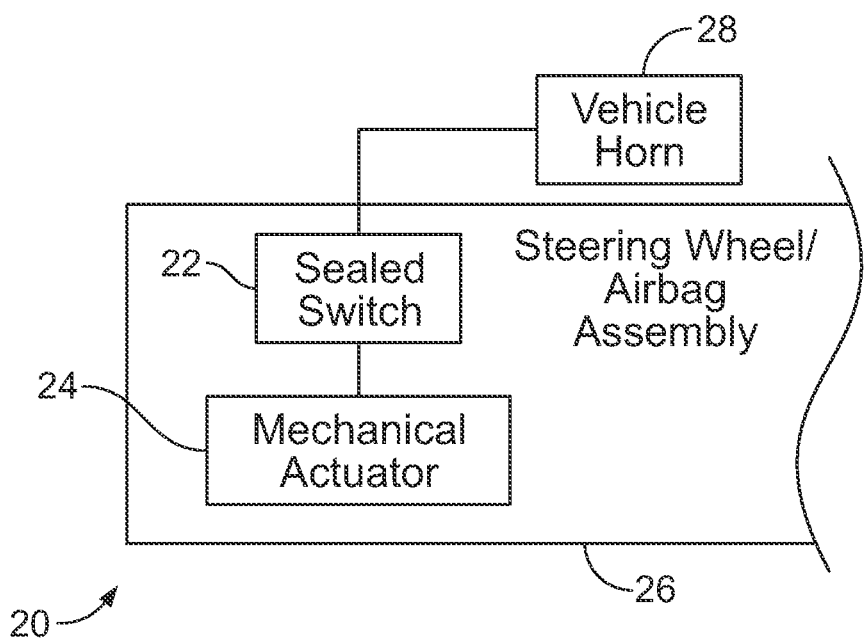
FIG. 1 is a block diagram of a switch arrangement formed in accordance with various embodiments.

The foregoing summary and brief description of drawings, as well as the following detailed description of certain embodiments, will be better understood when read in conjunction with the appended drawings. To the extent that the figures illustrate diagrams of the functional or operational blocks of various embodiments, the functional or operational blocks are not necessarily indicative of the division between hardware or circuitry. Thus, for example, one or more of the functional or operational blocks may be implemented in a single piece of hardware or multiple pieces of hardware. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments provide an electrical switch for use in vehicle applications, particularly for use in a steering wheel/driver airbag assembly for horn activation. For example, as illustrated generally in FIG. 1, a switch arrangement 20 may be provided and configured for use in a vehicle. In the illustrated embodiment, the switch arrangement 20 includes a sealed switch 22 coupled to a mechanical actuator 24, which activates the sealed switch 24. The mechanical actuator 24 may be operated by a user, for example, by applying pressure or compression to the mechanical actuator 24 as described in more detail herein.

The sealed switch 22 and mechanical actuator 24 may be mounted within or to a steering wheel/airbag assembly 26, such that pressure applied to the steering wheel/airbag assembly 26 causes the mechanical actuator 24 to compress and activate the sealed switch 22. In this exemplary embodiment, activation of the sealed switch 22 results in activation of a vehicle component, for example, activation of a connected vehicle horn 28. Accordingly, with the sealed switch 22 and/or mechanical actuator 24 mounted within or to the steering wheel/airbag assembly 26, pressure applied to the steering wheel/airbag assembly 26, such as along an edge or in the middle of a front face of the steering wheel/airbag assembly 26, causes activation of the vehicle horn 28. The vehicle horn 28 generally remains on as long as pressure is being applied to the steering wheel/airbag assembly 26.

Figure 2:
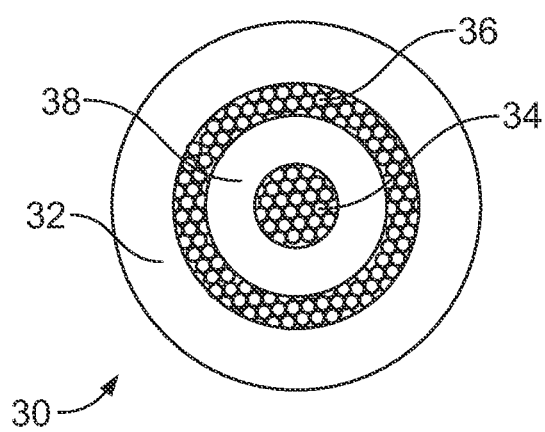
FIG. 2 is a cross-sectional view of a sealed switch formed in accordance with various embodiments.

The sealed switch 22 may take different forms. For example, in various embodiments, the sealed switch 22 is a hermetically sealed component that prevents or resists exposure to the environment and contaminants. The sealed switch 22 may be formed form a pressure actuated cable 30, a cross-section of which is shown in FIG. 2. The pressure actuated cable 30 is configured generally as a coaxial cable contact switch activated by applying pressure to and/or compressing the pressure actuated cable 30. The pressure actuated cable 30 includes an outer sheath 32 forming a hermetically sealed cover or casing for the pressure actuated cable 30. The outer sheath 32 may be formed from different materials, for example, from a polyurethane material. The outer sheath 32 defines an axial length that encompasses and surrounds the electrical conductors therein. The outer sheath 32 may be configured as a cable jacket for the pressure actuated cable 30.

The pressure actuated cable 30 includes a first conductor 34 and a second conductor 36 that are arranged in a coaxial configuration within the outer sheath 32 such that the first and second conductors 34 and 36 are concentrically aligned within the outer sheath 32 about a central axis of the pressure actuated cable 30. The first conductor 34 is a center conductor formed from an electrically conductive material. For example, the first conductor 34 may be formed from one or more strands of an electrically conductive material. The electrically conductive material may be any type of material that conducts electrical current. The electrically conductive material is not limited to a metal material (e.g., copper), but may be a non-metal material, a composite material, an alloy, among others, and combinations thereof. The second conductor 36 may be similarly formed.

The first conductor 34 is surrounded by an inner sheath 38, which separates the first conductor 34 from the second conductor 36. For example, the first conductor 34 and the second conductor 36 are coaxial and radially spaced apart from each other. The inner sheath 38 is formed from a semi-conductive material. For example, the inner sheath 38 may be formed from a material that is compressible or crushable such that the amount of pressure applied to the outer sheath 32, which causes the inner sheath 38 to compress, changes the resistance of the inner sheath 38. The resistance of the non-compressed inner sheath 38 is based on the type of material used (e.g., thermoplastics), which may include the type and amount of filler used. For example, in some embodiments, the resistance of the semi-conductive material forming the inner sheath 38 decreases as the pressure applied to the inner sheath 38 increases.

It should be noted that the first conductor 34, the second conductor 36 and the inner sheath 38 may be formed from any suitable material such that when pressure is applied to the outer sheath 32 the first and second conductors 34 and 36 are electrically connected to allow the flow of electrical current, thereby defining an on or activated state. When no pressure is applied to the outer sheath 32, or when the pressure is not sufficient to adequately compress the inner sheath 38, the first and second conductors 34 and 36 are electrically isolated by the inner sheath 38.

Thus, the pressure actuated cable 30 includes an inner electrical conductor, namely the first conductor 34, surrounded by a semi-conductive member, namely the inner sheath 38, which is surrounded by an outer electrical conductor, namely the second conductor 36, with the second conductor 36 surrounded by the outer sheath 32. The first conductor 34, inner sheath 38, second conductor 36 and outer sheath 32 are coaxial, with the outer sheath 32 positioned radially outward from the second conductor 36, which is positioned radially outward from the inner sheath 38, which is positioned radially outward from the first conductor 34. This sealed arrangement defines the pressure actuated cable 30 such that pressure applied to the pressure actuated cable 30 causes an electrical path to be formed through the first and second conductors 34 and 36, which activates, for example, a connected vehicle horn 28 (shown in FIG. 1).

Figure 3:
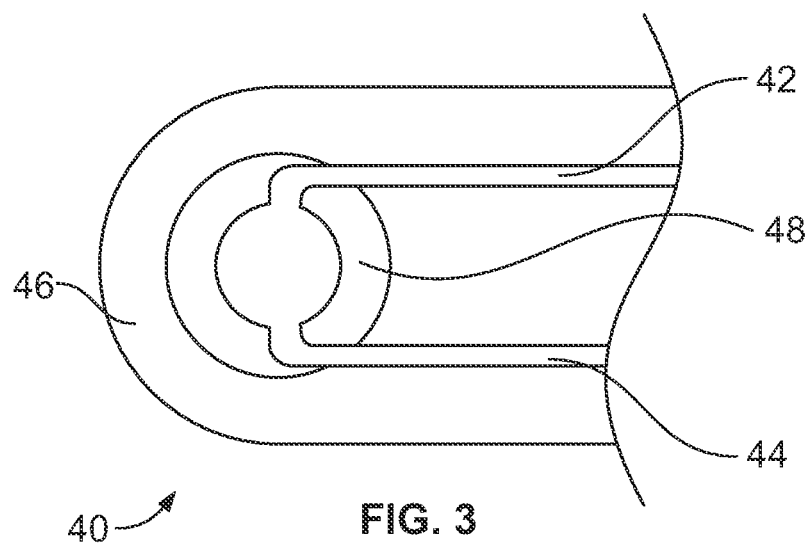
FIG. 3 is a diagrammatic perspective view of a sealed switch formed in accordance with other various embodiments.
Figure 4:
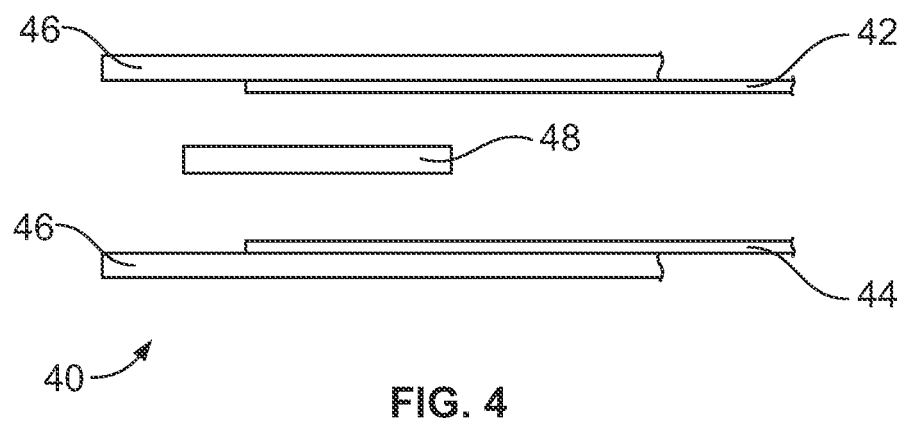
FIG. 4 is an exploded view of the sealed switch of FIG. 3 showing the layers of the sealed switched.

The sealed switch 22 make take other forms or have different configurations, for example, as shown in FIGS. 3 and 4 wherein the sealed switch 22 is formed from a pressure actuated cable 40 having a layered or sandwiched inner structure. FIG. 3 illustrates a diagrammatic perspective view of the pressure actuated cable 40 showing the elements therein and FIG. 4 is a view of the pressure actuated cable 40 showing the layers separated for clarity.

The pressure actuated cable 40 includes a first conductor 42 and a second conductor 44 surrounded by an outer sheath 46. The first and second conductors 42 and 44, as well as the outer sheath 46 may be formed from the same or similar materials as described in connection with the pressure actuated cable 30 of FIG. 2. In the illustrated embodiment, a semi-conductive layer 48 is sandwiched between the first and second conductors 42 and 44 within the outer sheath 46.

The pressure actuated cable 40 operates similar to the pressure actuated cable 30 such that when pressure is applied to the outer sheath 46 the first and second conductors 42 and 44 are electrically connected to allow the flow of electrical current, thereby defining an on or activated state. When no pressure is applied to the outer sheath 46, the first and second conductors 42 and 44 are electrically isolated by the semi-conductive layer 48. As illustrated, the first conductor 42 is connected to the semi-conductive layer 48, such that when a compressive force or load is applied on or to the outer sheath 46, the first conductor 42 is electrically connected to the second conductor 44 through the semi-conductive layer 48.

The sealed switch 22 may also take other forms or have different configurations, for example, as described in U.S. Pat. No. 4,762,970.

Thus, referring again to FIG. 1, the mechanical actuator 24 with the sealed switch 22 may together operate to activate the vehicle horn 28 when the vehicle operator pushes the driver airbag or a portion of the steering wheel/airbag assembly 26, such that the pressure is transferred to the mechanical actuator 24, which pressure is then applied to the sealed switch 22. The mechanical actuator 24 may be a load compression device for applying pressure to the sealed switch 22, which in various embodiments is a hermetically sealed pressure actuated cable. Thus, in various embodiments, a pressure actuated cable and a load compression device act as a switch to operate the vehicle horn 28.

In various embodiments, the mechanical actuator 24 may be formed, for example, as illustrated in FIGS. 5 through 7. It should be noted that the mechanical actuator 24 is not limited to the illustrated embodiments, but may be any device capable of applying a load or compression to the sealed switch 22. The mechanical actuator 24 in the illustrated embodiment includes a housing 50 formed from a cover 52 (e.g., a top cover) and a base 54 (e.g., a bottom and side walls) having a cavity therein 56 for receiving a portion of the pressure actuated cable 30 or 40 (with the pressure actuated cable 30 illustrated in FIGS. 5 through 7). The housing 50 is generally octagonal shaped in cross-section (from top to bottom), but may take other shapes (e.g., square, rectangle, circle, etc.). The cover 52 and base 54 are coupled together with a hinge 58 that allows relative movement of the cover 52 and the base 54. The hinge 58 may be an arcuate or curved arm extending between the cover 52 and the base 54. It should be noted that in some embodiments, the cover 52, base 54 and hinge 58 are formed as a single unitary construction, for example, co-modeled as a single unitary piece. Accordingly, the cover 52, base 54 and hinge 58 may be integrally formed.

The hinge 58 optionally may be resilient in some embodiments and in other embodiments operates as a tether between the cover 52 and base 54. When configured as a resilient member, the hinge 58 may be normally biased to move the cover 52 away from the base, which defines a non-actuated state or position. In the non-actuated state, a gap 60 exists between the cover 52 and the base 54. It should be noted that in this state, either no load is applied or a load not sufficient to cause the pressure actuated cable 30 or 40 to conduct electrical current is applied (e.g., semi-conductive material in not deformed or not sufficiently deformed). When pressure is applied to the mechanical actuator 24, for example, to the cover 52 and/or the base 52, which may depend on the orientation of the mechanical actuator 24 in the steering wheel/airbag assembly 26 (shown in FIG. 1), the size of the gap 60 decreases such that the distance between the cover 52 and base 54 decreases, which is illustrated in FIGS. 5 and 6, by the distances $D_1$ and $D_2$, respectively.

The mechanical actuator 24 further includes a compressing member 62 illustrated in this embodiment as an extension or block on a bottom side of the cover 52, which may extend along all or a portion of the mechanical actuator 24 in the same direction as the pressure actuated cable 30 or 40. The compressing member 62 is sized and shaped such that in a non-load state as illustrated in FIG. 5, the pressure actuated cable 30 or 40 is not compressed and the compressing member 62 abuts or is adjacent to a surface (e.g., a top surface) of the pressure actuated cable 30 or 40. Accordingly, the pressure actuated cable 30 or 40 is in a non-activated or off state such that the conductors therein are not electrically connected.

When pressure is applied to the mechanical actuator 24 (illustrated by the arrow P in FIG. 6), such that a loaded state is provided, the compressing member 62 compresses the pressure actuated cable 30 or 40, or a portion thereof, such that the pressure actuated cable 30 or 40 is in an activated state. In this activated state, the conductors are electrically connected to allow electrical flow therethrough, for example, low electrical current. For example, the gap 60 allows steering wheel armature points to compress the compressing member 62 against the pressure actuated cable 30 or 40.

The base 54 also includes openings 64 (only one opening in shown 64) on opposite sides of the base 54 that define slots for receiving therein the pressure actuated cable 30 or 40. The pressure actuated cable 30 or 40 may be inserted through the openings 64 with the cover 52 engaged with the base 54 in a closed state as shown in FIGS. 5 through 7. Alternatively, the pressure actuated cable 30 or 40 may be inserted into the openings 64 from the top with the cover 52 not engaged with the base 54 in an open state such that the cavity 56 is also accessible. Thereafter, the cover 52 is engaged with the base 54 having a portion of the pressure actuated cable 30 or 40 extending through the cavity 56 between the sides having the openings 64.

Additionally, the mechanical actuator 24 includes a locking member 66, shown on a side opposite the hinge 58, for maintaining the cover 52 in an engaged and closed position with the base 54. The locking member 66 includes an elongated opening 68, which extends vertically (illustrated as a rectangular opening), and is configured to receive therein a tab 70 (or protrusion) that extends into the opening 68 from the cover 52. Accordingly, the locking member 66 with the opening 68 and tab 70 cooperate to maintain the cover 52 in a closed state or position relative to the base 54, thereby forming a latching arrangement.

In operation, when pressure is applied to the cover 52, the tab 70 moves or slides along or within the opening 68, for example, vertically downward in the opening 68 as oriented in FIG. 7, such that pressure is applied to the pressure actuated cable 30 or 40 by the compressing member 62. Accordingly, a switch or switching arrangement, and in particular, an electrical switch or switching arrangement, is provided that allows a vehicle operator to activate a vehicle horn by applying pressure to the steering wheel/airbag assembly 26.

Figure 8:
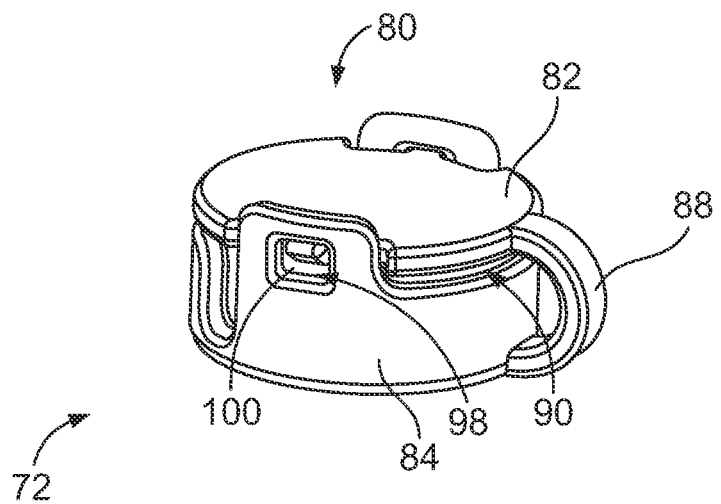
FIG. 8 is a perspective view of a mechanical actuator formed in accordance with another embodiment.
Figure 9:
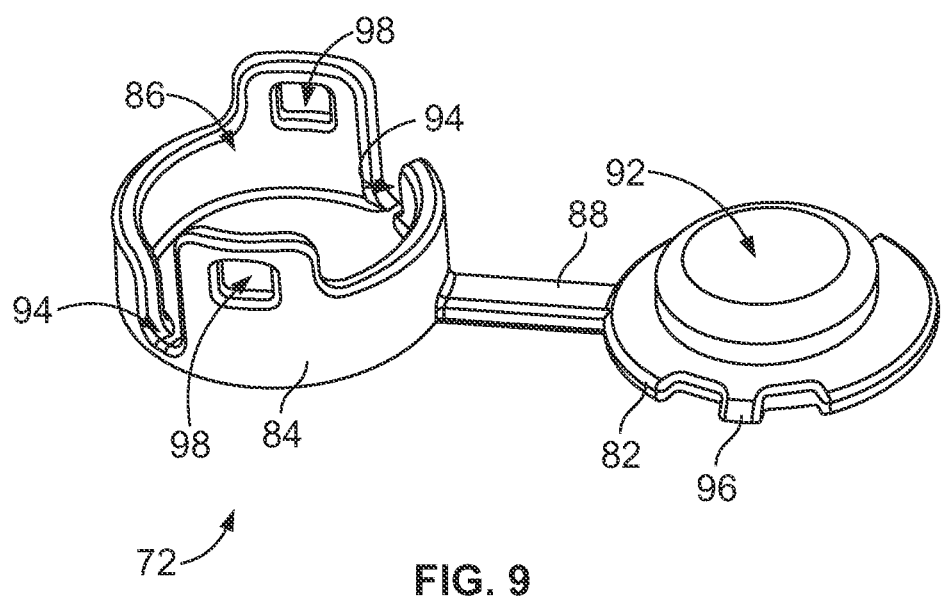
FIG. 9 is perspective view of the mechanical actuator of FIG. 8 with the cover removed.

It should be noted that variations and modifications are contemplated. For example, in various embodiments, a mechanical actuator 72 may be formed, for example, as illustrated in FIGS. 8 and 9. In the various embodiments, like numerals represent like parts. The mechanical actuator 72 in the illustrated embodiment includes a housing 80 formed from a cover 82 (e.g., a top cover) and a base 84 (e.g., a bottom and side walls) having a cavity therein 86 for receiving a portion of the pressure actuated cable 30 or 40 (with the pressure actuated cable 30 illustrated in FIGS. 5 through 7). The housing 80 is generally circular shaped in cross-section (from top to bottom) to generally define a hollow cylinder. The cover 52 and base 54 are coupled together with a hinge 88 that allows relative movement of the cover 82 and the base 84. The hinge 88 is an arm (e.g., a flexible arm) that extends from a lower end of the base 82 to the cover 82 and forms an arcuate or curved shape when the cover 82 is attached to the base. 84. It should be noted that in some embodiments, the cover 82, base 84 and hinge 88 are formed as a single unitary construction, for example, co-modeled as a single unitary piece. Accordingly, the cover 82, base 84 and hinge 88 may be integrally formed. Additionally, the cover 82, base 84 and hinge 88 may be formed from the same material or different materials (e.g., plastic, rubber, etc.).

The hinge 88 optionally may be resilient in some embodiments and in other embodiments operates as a tether between the cover 82 and base 84. When configured as a resilient member, the hinge 88 may be normally biased to move the cover 82 away from the base, which defines a non-actuated state or position. In the non-actuated state, a gap 90 exists between the cover 82 and the base 84. It should be noted that in this state, either no load is applied or a load not sufficient to cause the pressure actuated cable 30 or 40 to conduct electrical current is applied (e.g., semi-conductive material in not deformed or not sufficiently deformed). When pressure is applied to the mechanical actuator 72, for example, to the cover 82 and/or the base 82, which may depend on the orientation of the mechanical actuator 72 in the steering wheel/airbag assembly 26 (shown in FIG. 1), the size of the gap 90 decreases such that the distance between the cover 82 and base 84 decreases.

The mechanical actuator 72 further includes an compressing member 92 illustrated in this embodiment as an extension or block (e.g., a button) on a bottom side of the cover 92, which may extend along all or a portion of the mechanical actuator 72 in the same direction as the pressure actuated cable 30 or 40. The compressing member 92 is sized and shaped such that in a non-load state, the pressure actuated cable 30 or 40 is not compressed and the compressing member 92 abuts or is adjacent to a surface (e.g., a top surface) of the pressure actuated cable 30 or 40. Accordingly, the pressure actuated cable 30 or 40 is in a non-activated or off state such that the conductors therein are not electrically connected.

When pressure is applied to the mechanical actuator 72, such that a loaded state is provided, the compressing member 92 compresses the pressure actuated cable 30 or 40, or a portion thereof, such that the pressure actuated cable 30 or 40 is in an activated state. In this activated state, the conductors are electrically connected to allow electrical flow therethrough, for example, low electrical current. For example, the gap 90 allows steering wheel armature points to compress the compressing member 92 against the pressure actuated cable 30 or 40.

The base 74 also includes openings 94 on opposite sides of the base 84 that define slots for receiving therein the pressure actuated cable 30 or 40. It should be noted that the while the slots 64 in the embodiment of FIG. 7 are positioned generally perpendicular to the hinge 58, in this embodiment, the openings 94 are positioned offset from the axis of the hinge 88. The pressure actuated cable 30 or 40 may be inserted through the openings 94 with the cover 82 engaged with the base 84 in a closed state as shown in FIG. 8. Alternatively, the pressure actuated cable 30 or 40 may be inserted into the openings 94 from the top with the cover 82 not engaged with the base 84 in an open state such that the cavity 86 is also accessible. Thereafter, the cover 82 is engaged with the base 84 having a portion of the pressure actuated cable 30 or 40 extending through the cavity 86 between the sides having the openings 84.

Additionally, the mechanical actuator 72 includes a locking members 96 (illustrated as tabs extending from the cover 82), and which are positioned perpendicular to the axis of the hinge 88, for maintaining the cover 82 in an engaged and closed position with the base 84. The locking members 96 are received within openings 98 provided through the walls of the base 84 (along a top portion). The openings 98 likewise provide gaps 100 to allow compression of the cover 82 on the base 84. Thus, the locking members 96 are received within the openings 98 and cooperate to maintain the cover 82 in a closed state or position relative to the base 84, thereby forming a latching arrangement.

In operation, when pressure is applied to the cover 82, the locking members 96 move or slide along or within the openings 98, for example, vertically downward in the opening 98 as oriented in FIG. 8, such that pressure is applied to the pressure actuated cable 30 or 40 by the compressing member 92. Accordingly, a switch or switching arrangement, and in particular, an electrical switch or switching arrangement, is provided that allows a vehicle operator to activate a vehicle horn by applying pressure to the steering wheel/airbag assembly 26.

Figure 10:
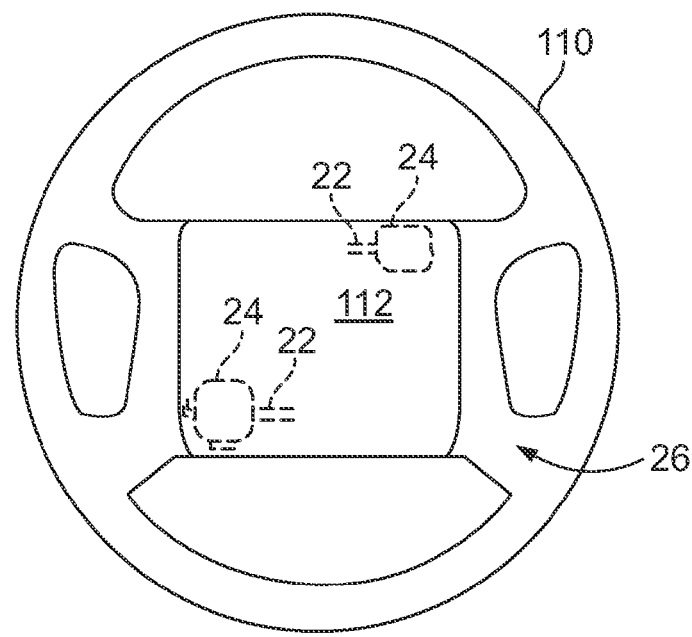
FIG. 10 is a top plan view of a steering wheel with a steering wheel/airbag assembly and having a switch arrangement formed in accordance with various embodiments.

For example, FIG. 10 illustrates an embodiment of the invention in combination with the steering wheel/airbag assembly 26 mounted to a steering wheel 110 (which may also be referred to herein as a steering wheel assembly). The steering wheel/airbag assembly 26 may be, for example, a module mounted to a center portion of the steering wheel 110 with the sealed switch 22 and mechanical actuator 24 (or the actuator 72) operating as a pressure activated vehicle horn switch.

Figure 11:
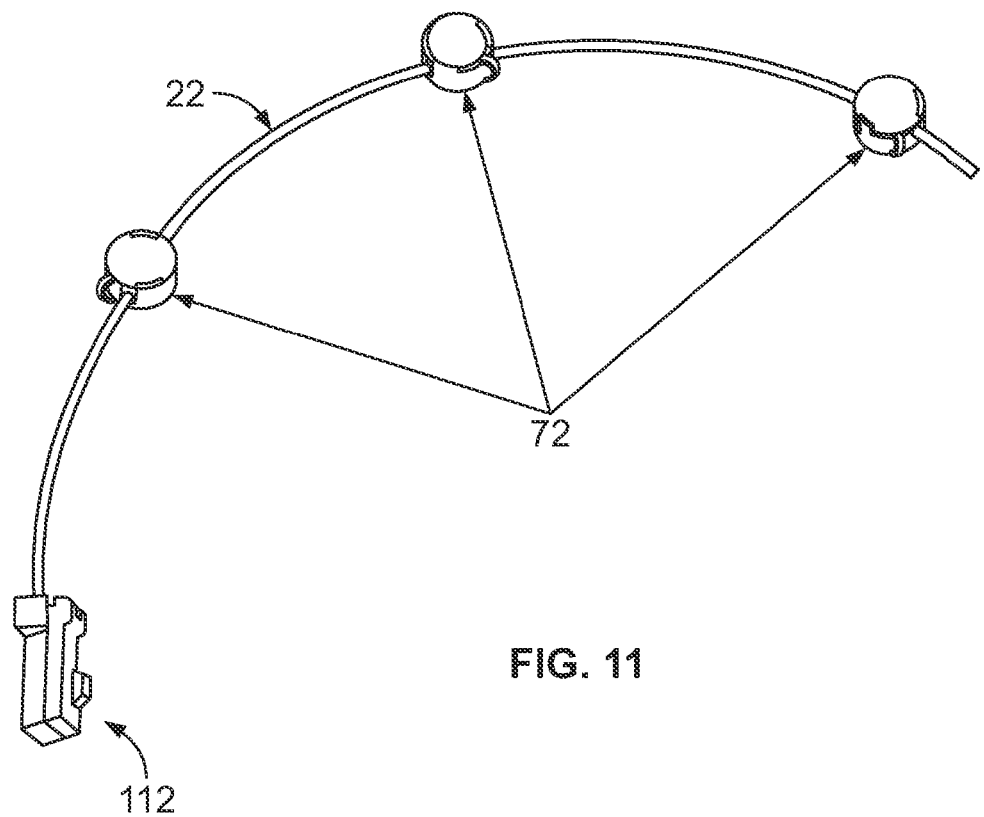
FIG. 11 is a perspective view showing multiple mechanical actuators in accordance with one embodiment.

It should be noted that although the sealed switch 22 and mechanical actuator 24 or 72 are located or positioned in two opposite corners relative to the steering wheel/airbag assembly 26 (illustrated in a lower left corner and upper right corner of the steering wheel/airbag assembly 26), the positioning and/or orientation may be changed as desired or needed. For example, the sealed switch 22 and mechanical actuator 24 or 72 may be positioned in different corners or along different sides or in a center region of the steering wheel 110. For example, as illustrated in FIG. 11, a plurality of actuators 72 (three are shown, but more may be provided), are positioned along the sealed switch 22, which include a connecter 112 at one end, which may be used to connect to an electrical source (not shown).

In general, the sealed switch 22 and mechanical actuator 24 or 72 may be positioned at any location relative to the steering wheel/airbag assembly 26 such that depression thereof applies pressure to the mechanical actuator 24 or 72, which compresses the sealed switch 22, thereby activating the connected vehicle horn 28 (shown in FIG. 1).

Figure 12:
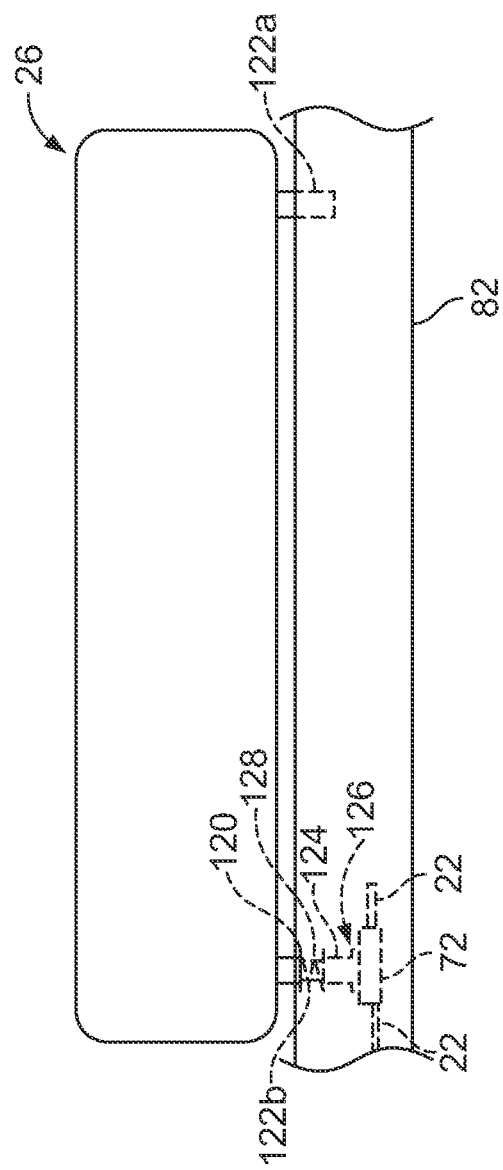
FIG. 12 is a side view of a steering wheel with a steering wheel/airbag assembly and having a switch arrangement formed in accordance with various embodiments.

In various embodiments, the sealed switch 22 and mechanical actuator 24 or 72 (mechanical actuator 72 is shown) are positioned behind the steering wheel/airbag assembly 26 as illustrated in FIG. 12. As shown therein, the steering wheel/airbag assembly 26 is mounted to a support member 120 (e.g., steering wheel armature), which may be a portion of the steering wheel 110 and surrounded by a steering wheel shroud. The steering wheel/airbag assembly 26 includes an airbag and associated components that are provided in any suitable manner. The steering wheel/airbag assembly 26 is mounted to the support member 120 using one or more fasteners 122 (two fasteners 122a and 122b are illustrated). The fasteners 122 may be any type of securing or fastening means such as a nut and bolt combination, a stud, etc., as described in ore detail below. The fasteners 122 generally extend into openings (not shown) of the support member 120 to secure the steering wheel/airbag assembly 26 to the steering wheel 110.

The securing arrangement illustrated in FIG. 12 also allows activation of the vehicle horn 28 (shown in FIG. 1) as described in more detail herein. In the illustrated embodiment, one of the fasteners 122b operates to secure the steering wheel/airbag assembly 26 to the support member 120, as well as allow a user to apply pressure to the mechanical actuator 72, which compresses the sealed switch 22, thereby activating the connected vehicle horn 28. It should be noted that the mechanism to apply pressure on the mechanical actuator 72 may also be provided separately from the fastener 84b.

In the illustrated embodiment, the fastener 122b includes a stud or post portion 124 that extends from the steering wheel/airbag assembly 26 into the support member 120. The post portion 124 includes an engagement end 126 that is configured to engage the cover 82 of the mechanical actuator 72 to apply pressure thereto. The engagement end 126 in some embodiments is planar, for example, the planar end of the post portion 124 and having the same diameter as the post portion 124. However, in other embodiments, the engagement end 126 is larger in order to contact a larger surface area of the cover 82 of the mechanical actuator 72. For example, as illustrated in FIG. 12, in some embodiments the engagement end 126 is a flared end or base for applying pressure to the cover 72.

Accordingly, when pressure is applied to a front face 112 of the steering wheel/airbag assembly 26, at least the side of the steering wheel/airbag assembly 26 having the sealed switch 22 and mechanical actuator 72 is configured to move. Accordingly, in the illustrated embodiment, the fastener 122b moves toward and applies pressure to the cover 82 of the mechanical actuator 72, thereby causing the sealed switch 22 to be compressed as described in more detail herein. In various embodiments, a spring 128 also may be optionally provided surrounding a portion of the fastener 122b such that when pressure is removed from the steering wheel/airbag assembly 26, the spring 128 is biased to move the fastener 122b away from the mechanical actuator 72, thereby releasing the compression on the sealed switch 22. For example, the spring 128 may be pre-tensioned or pre-stressed and provided between one or more flanges (or rims) such that the engagement end 126 is maintained in a fixed position relative to the mechanical actuator 72 when no pressure is applied and also may limit the maximum amount of movement of the fastener 122b. Thus, the fastener 122b is spring loaded in some embodiments.

It should be noted that any suitable means may be provided for fastening the steering wheel/airbag assembly 26 to the steering wheel 110, as well as for applying pressure to the mechanical actuator 24 or 72. In various embodiments, the pressure actuated cable 30 or 40 is provided in combination with the mechanical actuator 24 or 72 to operate as an electrical switch for activating the vehicle horn 28 (shown in FIG. 1). Moreover, it should be noted that the fastener 122b may directly engage the pressure actuated cable 30 or 40 to compress the semi-conductive material therein.

Figure 13:
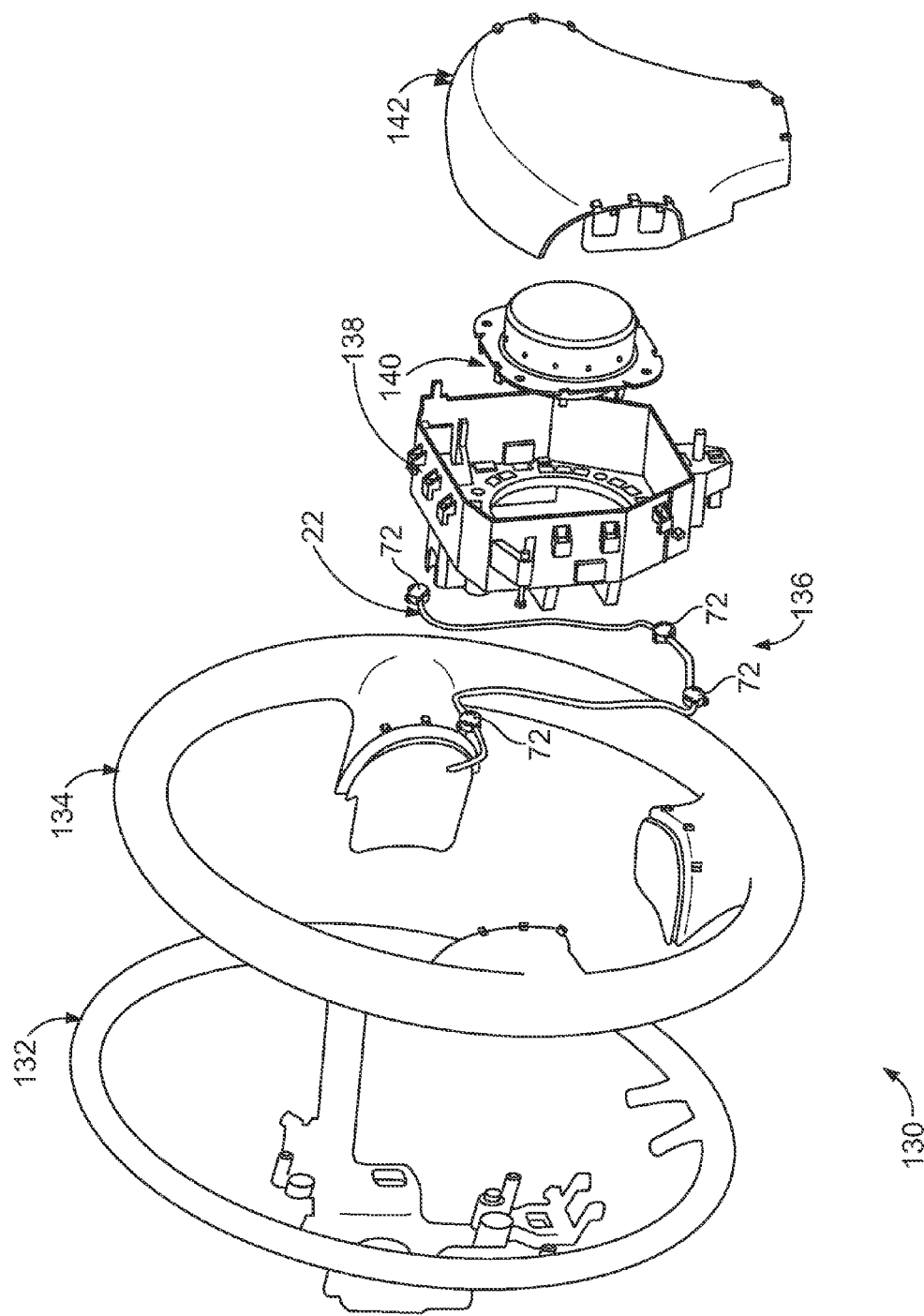
FIG. 13 is an exploded view of a steering wheel/airbag assembly having an electrical switch assembly in accordance with one embodiment.

FIG. 13 is an exploded view of a steering wheel and airbag assembly 130 in which the various embodiments may be implemented. As can be seen, a steering wheel armature 132 includes an armature overmold 134, which together form the steering wheel 110 (shown in FIG. 10). An electrical switch assembly 136 formed from the mechanical actuators 72 or 24 and the sealed switch 22 extend within the inner circumference of the steering wheel armature 132 and which may take different shapes or configurations (illustrated with the sealed switch 22 in a generally "U" shaped configuration). The electrical switch assembly 136, which in various embodiments forms a coaxial horn wire, is secure to an airbag housing 138, which includes an airbag inflator 140 therein. An airbag cover 142 couples to the airbag housing on an opposite side to the electrical switch assembly 136 (with the airbag inflator 140 inside the airbag housing 138). The airbag cover 142, thus, may be pushed or pressed to compress the electrical switch assembly 136 and actuate the horn.

Figure 14:
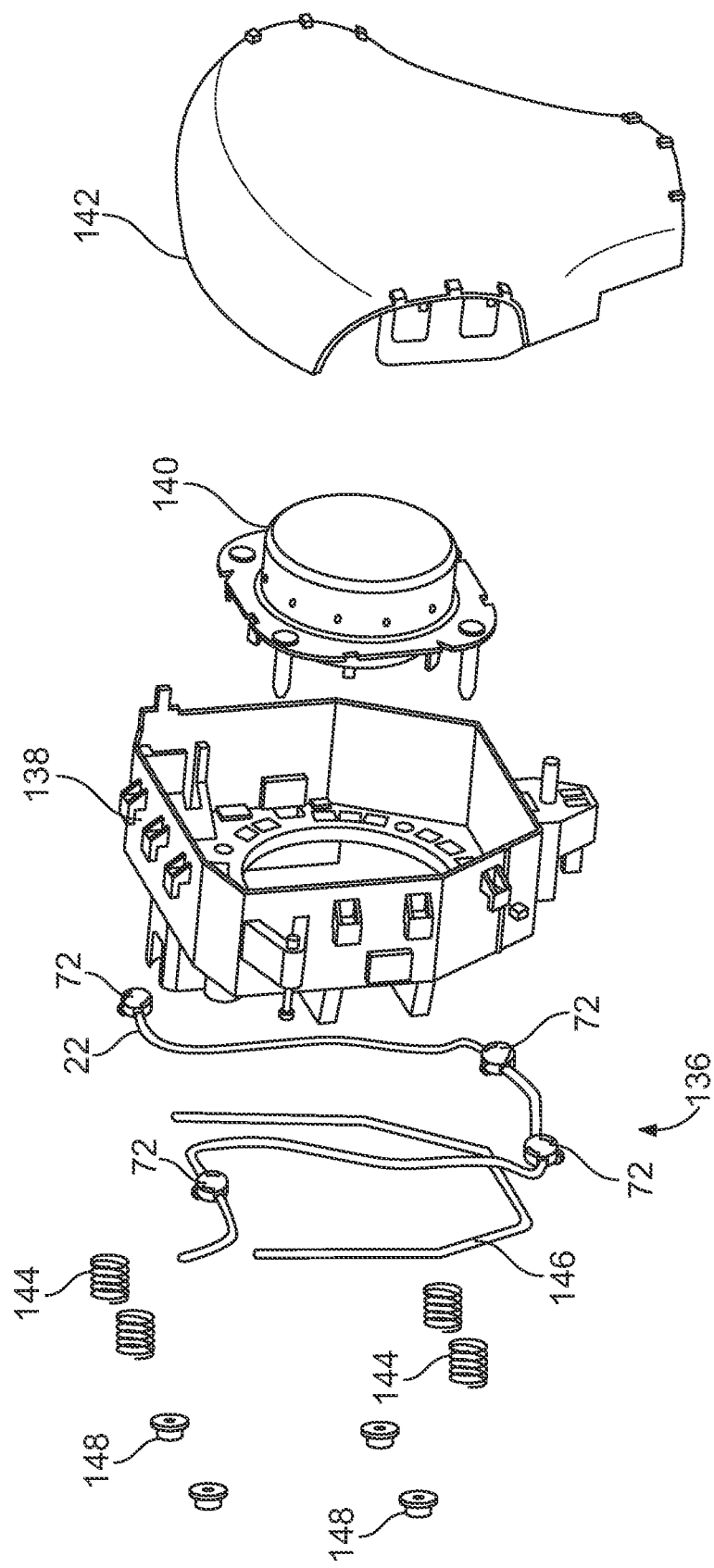
FIG. 14 is an exploded view showing a coupling arrangement of the electrical switch assembly to the steering wheel/airbag assembly of FIG. 13.
Figure 15:
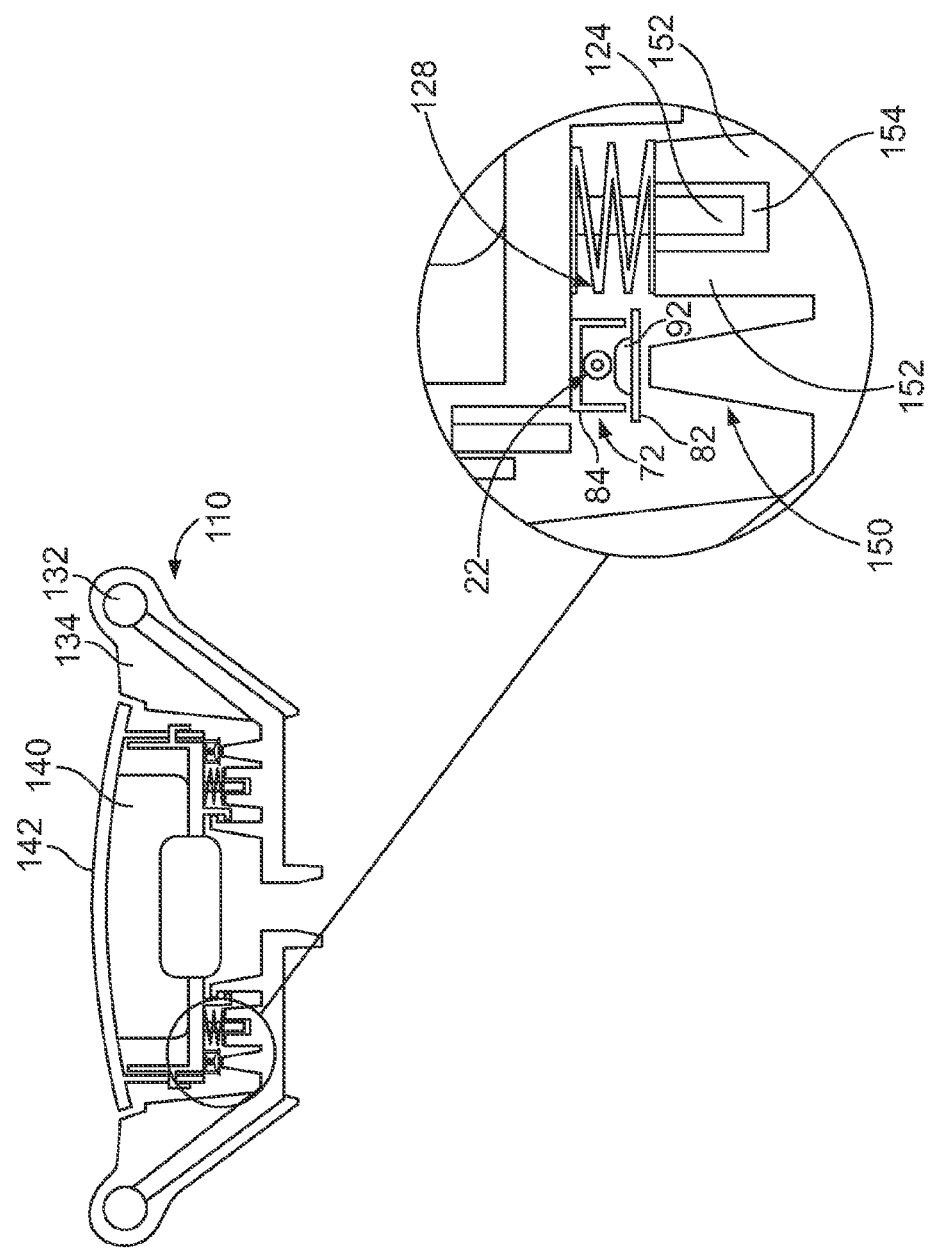
FIG. 15 is a simplified cross-sectional view showing an electrical switch assembly installed in a steering wheel/airbag assembly having an electrical switch assembly in accordance with one embodiment.

With respect to the coupling of the electrical switch assembly 136 to the steering wheel and airbag assembly 130, an exploded view is shown in FIG. 14. As can be seen, the steering wheel and airbag assembly 130 mounts to a back of the airbag housing 138 (opposite the airbag cover 142). In this embodiment, horn springs 144 in combination with an omega spring 146 are used to couple the electrical switch assembly 136 with nuts 148, such that the airbag cover 142 can be compressed on the electrical switch assembly 136, thereby actuating the horn.

Thus, as shown in FIG. 14, the electrical switch assembly 136 may be positioned between the airbag housing 138 and a post 150 of the steering wheel armature. In the embodiment, the springs 144 (which may be embodied as the spring 128 shown in FIG. 12) are between the airbag housing 138 and posts 152 of the steering wheel armature 132, which defined an opening 154 for receiving the post 124 therein.

Figure 16:
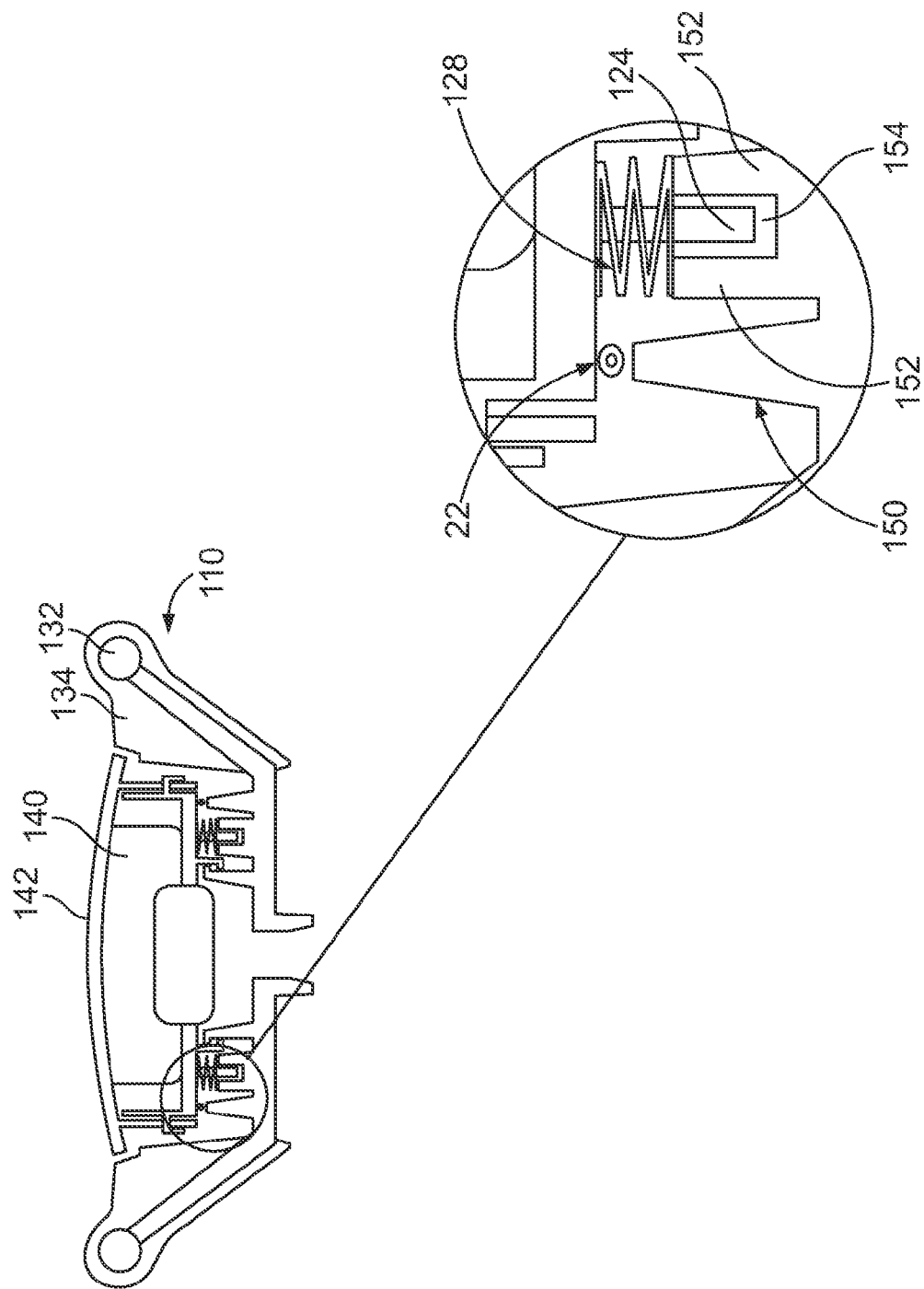
FIG. 16 is a simplified cross-sectional view showing a sealed switch without a mechanical actuator installed in a steering wheel/airbag assembly in accordance with one embodiment.

In another embodiment, as illustrated in FIG. 16, the mechanical actuator 72 is removed. Accordingly, the armature post 150 pushes directly onto the sealed switch 22. Thus, the sealed switch 22 is compressed between the airbag housing 138 and the armature post 150.

Figure 17:
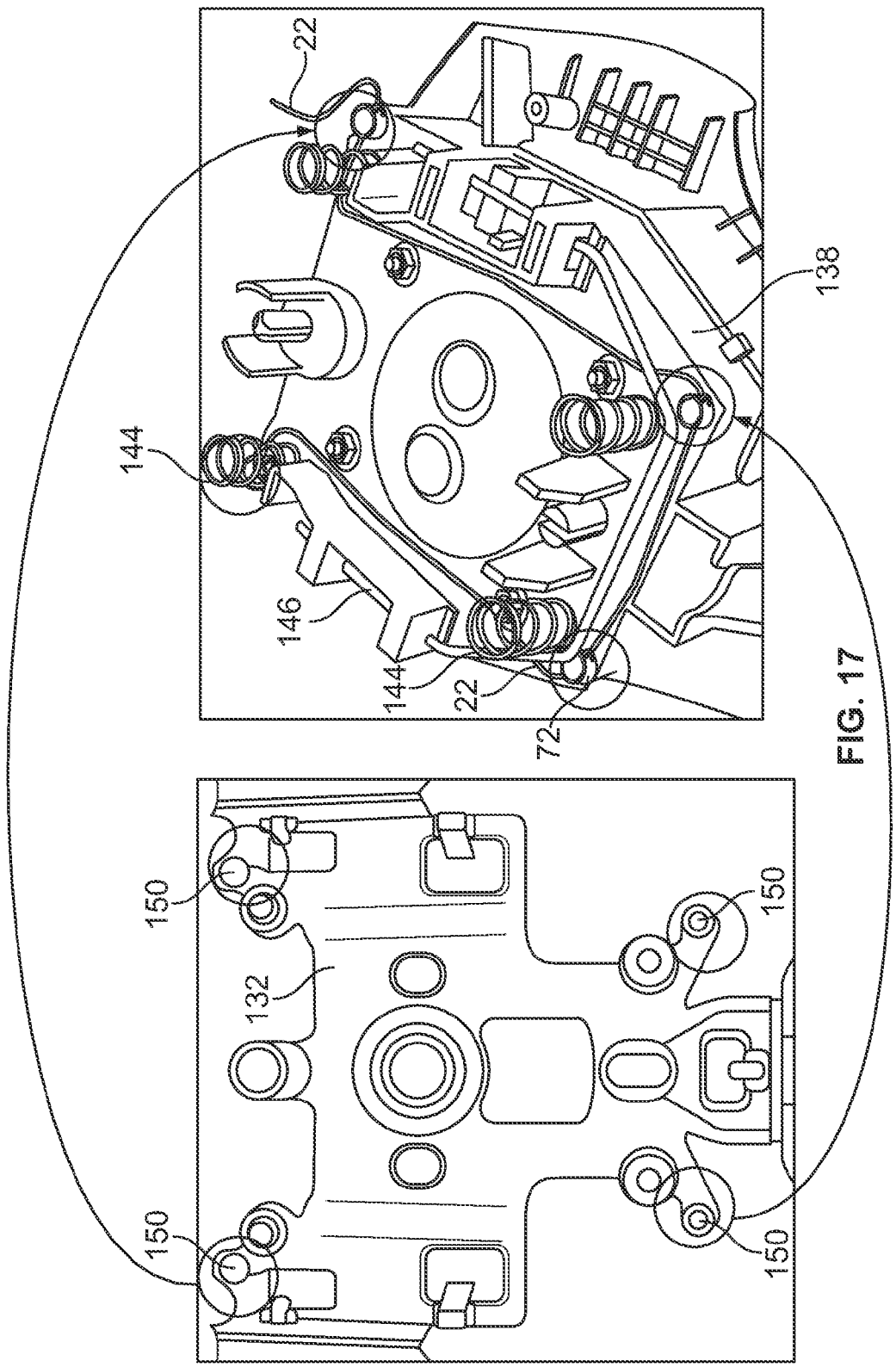
FIG. 17 is a perspective view showing an armature post configuration in accordance with one embodiment.
Figure 18:
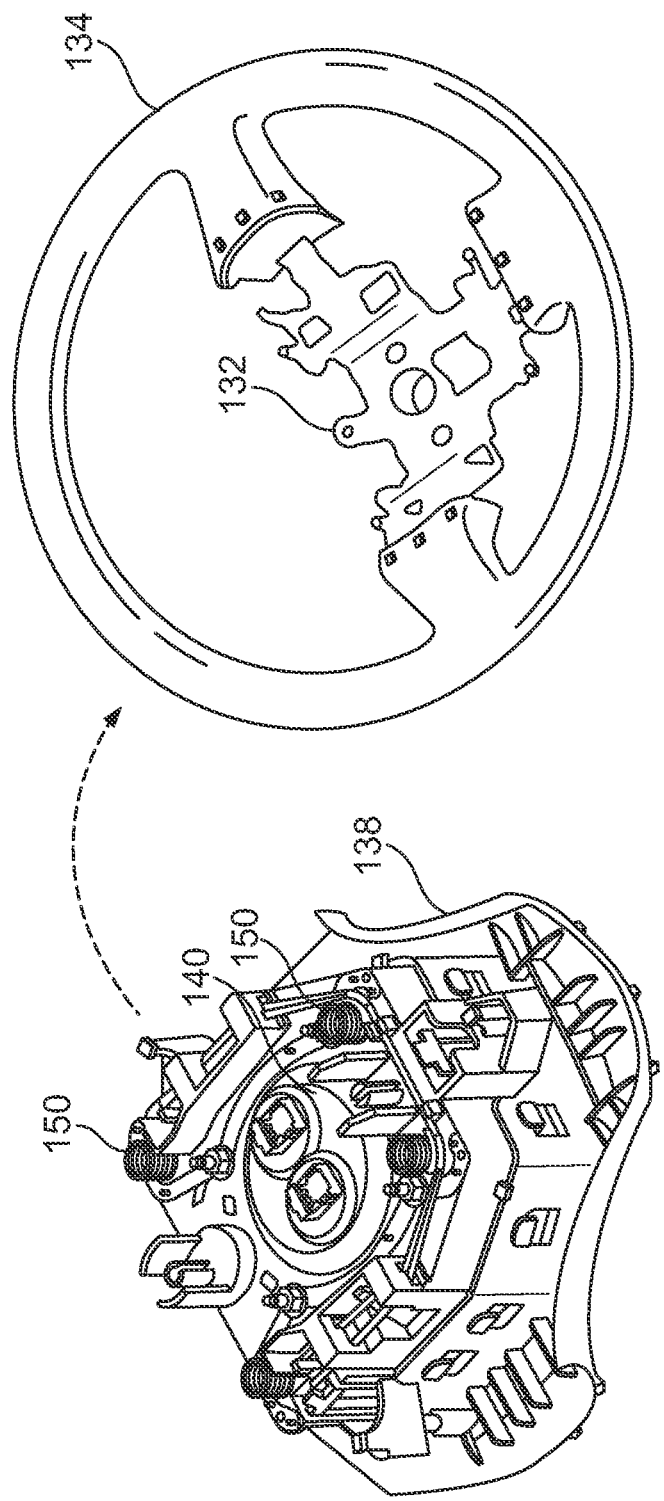
FIG. 18 is a perspective view showing an airbag housing and steering wheel armature configuration in accordance with one embodiment.

FIG. 17 illustrates one embodiment having four mechanical actuators 72. In operation, the mechanical actuators 72 are compressed by four armature posts 150. Thus, the mechanical actuators 72 are positioned to allow such compression by the armature posts 150. As can been seen in FIG. 18, the airbag housing 138 then may be coupled to the steering wheel armature 132 by fitting and securing the airbag housing 138 to the steering wheel armature 132.

Accordingly, various embodiments provide an electrical switch, for example, a low current electrical switch for vehicle applications that reduces the likelihood of contamination from corrosion and foreign substances from the environment. Also, one or more of the components may be provided as part of a kit for installation within a vehicle, for example, as part of an electrical switch kit, such as an electric horn switch kit for a vehicle having a steering wheel/airbag assembly. The kit in some embodiments includes a pressure actuated cable and a mechanical actuator.

It is to be understood that the above description is intended to be illustrative, and not restrictive. For example, the above-described embodiments (and/or aspects thereof) may be used in combination with each other. In addition, many modifications may be made to adapt a particular situation to the teachings of the various embodiments without departing from the scope of the various embodiments. While the dimensions and components described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. An electrical switch arrangement for a vehicle, the electrical switch arrangement comprising:
   a pressure actuated cable having a compressible semi-conductive material between a plurality of conductors therein;
   a mechanical actuator comprising,
      a housing having a portion of the pressure actuated cable therein, the housing formed from a cover separate from a cover of a steering wheel/airbag assembly and a base with a cavity therein for receiving the portion of the pressure actuated cable, the cover of the housing and the base coupled together to allow relative movement of the cover of the housing and the base when a pressure is applied thereto by the cover of the steering wheel/airbag assembly;
      a hinge coupling the cover of the mechanical actuator to the base, the hinge being resilient to normally bias the cover of the mechanical actuator away from the base to define a non-actuated state of the mechanical actuator having a gap between the cover of the mechanical actuator and the base;
      a latching arrangement including a locking member on a side opposite the hinge to maintain the cover of the mechanical actuator in an engaged and closed position with the base, the locking member including an elongated opening configured to receive therein and engage a tab of the cover to allow movement of the cover relative to a base of the mechanical actuator; and
   the mechanical actuator configured to compress the pressure actuated cable such that an electrical path is formed through the plurality of conductors to activate a vehicle horn, and the mechanical actuator further configured to cooperate with the steering wheel/airbag assembly to transfer pressure applied to the cover of the steering wheel/airbag assembly to the pressure actuated cable.

2. The electrical switch arrangement of claim 1, wherein the plurality of conductors comprise a pair of conductors and the compressible semi-conductive material is concentrically aligned between the pair of conductors.

3. The electrical switch arrangement of claim 1, wherein the plurality of conductors comprise a pair of conductors and the compressible semi-conductive material is layered between the pair of conductors.

4. The electrical switch arrangement of claim 1, wherein the steering wheel/airbag assembly comprises a fastener configured to engage the mechanical actuator, the fastener securing the steering wheel/airbag assembly to a steering wheel and configured to allow pressure applied to the cover of the-steering wheel/airbag assembly cover to compress the pressure actuated cable, the cover of the mechanical actuator contacting and compressing the pressure actuated cable.

5. The electrical switch arrangement of claim 1, wherein the cover of the mechanical actuator comprises a compressing member extending from a bottom side of the cover of the mechanical actuator, the compressing member sized and shaped to compress the pressure actuated cable when a pressure is applied to the cover of the mechanical actuator.

6. The electrical switch arrangement of claim 1, wherein the mechanical actuator comprises a housing having includes openings in side walls thereof for receiving therein the pressure actuated cable such that the pressure actuated cable extends through the housing generally parallel to the cover of the mechanical actuator.

7. The electrical switch arrangement of claim 6, wherein the pressure actuated cable comprises a sealed coaxial cable and the openings in the side walls are offset from an axis of the hinge.

8. The electrical switch arrangement of claim 1, wherein the compressible semi-conductive material changes resistance based on an applied pressure and the cover, base and hinge of the mechanical actuator are formed as a single unitary piece.

9. A vehicle horn switch for a steering wheel/airbag assembly, the vehicle horn switch comprising:
   a pressure actuated cable having an outer sheath;
   a pair of electrical conductors within the outer sheath, the pair of electrical conductors separated by a crushable semi-conductive material;
   a fastener connecting the steering wheel/airbag assembly to a steering wheel;
   a mechanical actuator comprising,
      a housing having a portion of the pressure actuated cable therein, the housing formed from a cover separate from a cover of a steering wheel/airbag assembly and a base with a cavity therein for receiving the portion of the pressure actuated cable, the cover of the housing and the base coupled together to allow relative movement of the cover of the housing and the base when a pressure is applied thereto by the cover of the steering wheel/airbag assembly;
      a hinge coupling the cover of the mechanical actuator to the base, the hinge being resilient to normally bias the cover of the mechanical actuator away from the base to define a non-actuated state of the mechanical actuator having a gap between the cover of the mechanical actuator and the base;
      a latching arrangement including a locking member on a side opposite the hinge to maintain the cover of the mechanical actuator in an engaged and closed position with the base the locking member including an elongated opening configured to receive therein and engage a tab of the cover to allow movement of the cover relative to a base of the mechanical actuator; and
   the mechanical actuator configured to compress the pressure actuated cable to crush the semi-conductive material and electrically connect the pair of electrical conductors such that an electrical path is formed through the pair of electrical conductors to activate the vehicle horn, and the mechanical actuator further configured to cooperate with the steering wheel/airbag assembly to transfer pressure applied to the cover of the steering wheel/airbag assembly to the pressure actuated cable with the fastener to compress the pressure actuated cable when a pressure is applied to the cover of the steering wheel/airbag assembly.

10. The vehicle horn switch of claim 9, wherein the housing comprises a cover and a base, and the fastener engages the mechanical actuator to compress the pressure actuated cable by applying a pressure to the cover of the mechanical actuator.

11. The vehicle horn switch of claim 10, wherein the cover is movable relative to the base to compress the pressure actuated cable and further comprising a resilient hinge connecting the cover and base of the mechanical actuator, the hinge normally biasing the cover of the mechanical actuator away from the base.

12. The vehicle horn switch of claim 9, wherein the housing further comprises openings in side walls thereof for receiving therethrough the pair of conductors and wherein the pair of conductors and the crushable semi-conductive material are concentrically aligned within the outer sheath.

13. The vehicle horn switch of claim 9, wherein the pair of conductors and the crushable semi-conductive material are layered within the outer sheath.

14. The vehicle horn switch of claim 9, wherein the fastener is spring loaded.

15. The vehicle horn switch of claim 9, wherein the fastener comprises a flared base.

16. The vehicle horn switch of claim 9, wherein the pressure actuated cable comprises a coaxial cable.

17. An electrical switch kit for a vehicle horn, the electrical switch kit comprising:
   a pressure actuated cable having a compressible semi-conductive material between a plurality of conductors therein;
   a mechanical actuator comprising,
      a housing having a portion of the pressure actuated cable therein, the housing formed from a cover separate from a cover of a steering wheel/airbag assembly and a base with a cavity therein for receiving the portion of the pressure actuated cable, the cover of the housing and the base coupled together to allow relative movement of the cover of the housing and the base when a pressure is applied thereto by the cover of the steering wheel/airbag assembly;
      a hinge coupling the cover of the mechanical actuator to the base, the hinge being resilient to normally bias the cover of the mechanical actuator away from the base to define a non-actuated state of the mechanical actuator having a gap between the cover of the mechanical actuator and the base;
      a latching arrangement including a locking member on a side opposite the hinge to maintain the cover of the mechanical actuator in an engaged and closed position with the base, the locking member including an elongated opening configured to receive therein and engage a tab of the cover to allow movement of the cover relative to a base of the mechanical actuator;
   the mechanical actuator configured to compress the pressure actuated cable such that an electrical path is formed through the plurality of conductors to activate a vehicle horn, the mechanical actuator further configured to cooperate with the steering wheel/airbag assembly to transfer pressure applied to the cover of the steering wheel/airbag assembly to the pressure actuated cable to compress the pressure actuated cable when a pressure is applied to the cover of the steering wheel/airbag assembly; and
   a fastener for connecting the mechanical actuator to the steering wheel/airbag assembly and transferring the pressure from the cover of the steering wheel/airbag assembly to the pressure actuated cable.

18. The electrical switch arrangement of claim 1, wherein the housing is separate from and located between the cover of the steering wheel/airbag assembly and the steering wheel rim.

* * * * *